United States Patent [19]
Dreher

[11] Patent Number: 4,551,717
[45] Date of Patent: Nov. 5, 1985

[54] INTELLIGENT KEY DISPLAY

[75] Inventor: Carl T. Dreher, Dallas, Tex.

[73] Assignee: Recognition Equipment Incorporated, Irving, Tex.

[21] Appl. No.: 440,778

[22] Filed: Nov. 10, 1982

[51] Int. Cl.$^4$ .............................................. G09G 3/00
[52] U.S. Cl. .............................. 340/712; 340/365 VL; 340/365 P; 200/314
[58] Field of Search ............ 340/365 P, 365 VL, 711, 340/712; 200/303, 306, 313, 314; 84/438

[56] References Cited

U.S. PATENT DOCUMENTS

| | | | |
|---|---|---|---|
| 3,825,923 | 7/1974 | Pirchl | 200/313 |
| 4,022,993 | 5/1977 | Shattuck | 200/314 X |
| 4,352,959 | 10/1982 | Warnecke et al. | 340/365 VL X |

Primary Examiner—Gerald L. Brigance
Assistant Examiner—Vince Kovalick
Attorney, Agent, or Firm—Richards, Harris, Medlock & Andrews

[57] ABSTRACT

A programmable key for use on a terminal has a microchip device incorporated therein to permit programming the function of the key, and one or more liquid crystal displays to indicate the programmed function of the key.

5 Claims, 5 Drawing Figures

INTELLIGENT KEY DISPLAY

FIELD OF THE INVENTION

This invention relates to keys for keyboards and more particularly to keys that may be programmed to perform a particular function and to display an identification of the programmed function.

BACKGROUND OF THE INVENTION

As computer terminals become more and more complex and perform a wider variety of tasks, it becomes necessary for a terminal operator to remember each key's special function. In some instances, such as an editor program on a data entry terminal, a single key may perform a variety of functions, depending upon the mode of the terminal or program. Depending upon how many keys are programmed for special or multiple functions, it may be confusing and difficult to keep track of the function of each key.

The function of eacy key may be identified by having a keyboard with many dedicated function keys. Another solution to keep track of the function of a key is to have a chart displayed near the keyboard describing the function of each key. Removable key cap covers, or labels may be attached to each key to identify its function. An alternative to the above is to have the operator remember the function of each programmed key. Obviously there are disadvantges to each of the above methods for identifying the function of a programmed key. When a key is dedicated, its function cannot be changed. Changing key caps or labels is time consuming and the caps and labels can be lost. Unless only one operator uses the terminal, remembering what key has been programmed to which function is not practical.

Key identification has been done using various types of displays, including those built into the key. In practice, once the display has been incorporated into the key, it is not easily modified or reprogrammed to indicate a change of function of the key. Display keys are described in U.S. Pat. Nos. 3,758,785, 3,787,837, and 3,856,605. However, none of these patents describes a programmable function key in which the key displays an indication of the programmed function.

SUMMARY OF THE INVENTION

In one embodiment of the invention, a key with a clear plastic key cap top has a liquid crystal display (LCD) positioned to display at the top of the key. Alternatively, a light emitting diode (LED) display may be used. LCD displays are used in the preferred embodiment by way of example. The LCD is driven by a microcircuit contained within the key. The circuit may be programmed to cause the LCD to display one or more alpha-numeric characters, depending upon the number of LCDs in the key cap. The display (for example four LCDs) and the microcircuit are mounted together on top of the key body. The circuit and the LCDs are mounted together on a single chip carrier to reduce mechanical stress and the possible breakage of interconnections. The key cap, which is hollow, fits around the assembly and projects down into the key body. The hollow stem of the key cap, when pushed downward, activates a standard mechanical switch within the key body producing the usual on/off or open/closed operation of a switch. Alternatively, upon pushing the key down, any number of functions can be changed, for example, interruption of a light beam, change of capacity or any other function used to indicate the depression of a key.

The top of the key is made of a clear plastic, glass or other transparent substance and is molded in the shape of a lens. The lens is configured such that the LCDs are focused when the key cap is up, thereby producing an enlarged image of the alpha-numerica characters displayed by the LCDs. By using the lens, the LCDs may be small, but by virtue of the magnification of the lens, the data displayed is enlarged and readable.

The technical advance represented by the invention will be better understood after reading the following description and claims in conjunction with the drawings in which:

Figure 1:
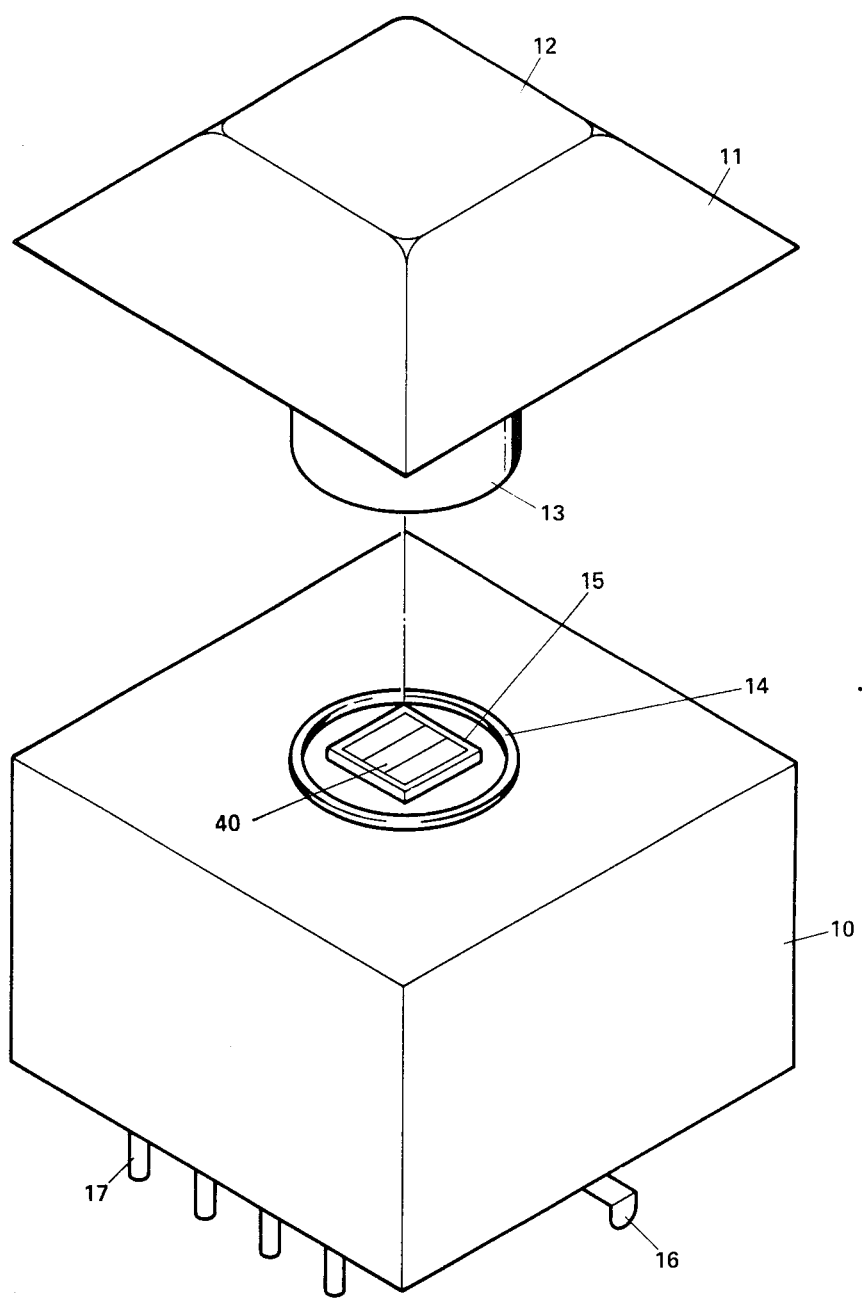
FIG. 1 is a pictorial representation of the programmable display key of the present invention.

Illustrated in FIG. 1 is a pictorial representation of the programmable function key of the present invention. By way of example, the key may have a key body 10 and a key cap 11. The key cap 11 has a lens 12 mounted in the top thereof. A hollow shaft 13 extends down from the cap and resides in an opening 14 in the top of the key body. Within the opening 14 is a device 15 having a multi character display 40 mounted thereon. Device 15 also contains a microcircuit 30 which will be described below. With the key cap in position, shaft 13 residing in the opening 14, the character display 40 will be visible through lens 12.

To facilitate mounting and connecting the key to a key board, there is at least one mounting tab 16 connected to the bottom of key body 10 and a plurality of interconnect pins 17 extending therethrough, but insulated from the bottom of the key body 10. The exact shape and configuration of the key body 10 and the key cap 11 can vary depending upon the configuration of the keyboard into which it is mounted and to reflect the desired styling. The configuration illustrated in the figures of the drawing is given only by way of example.

Figure 2:
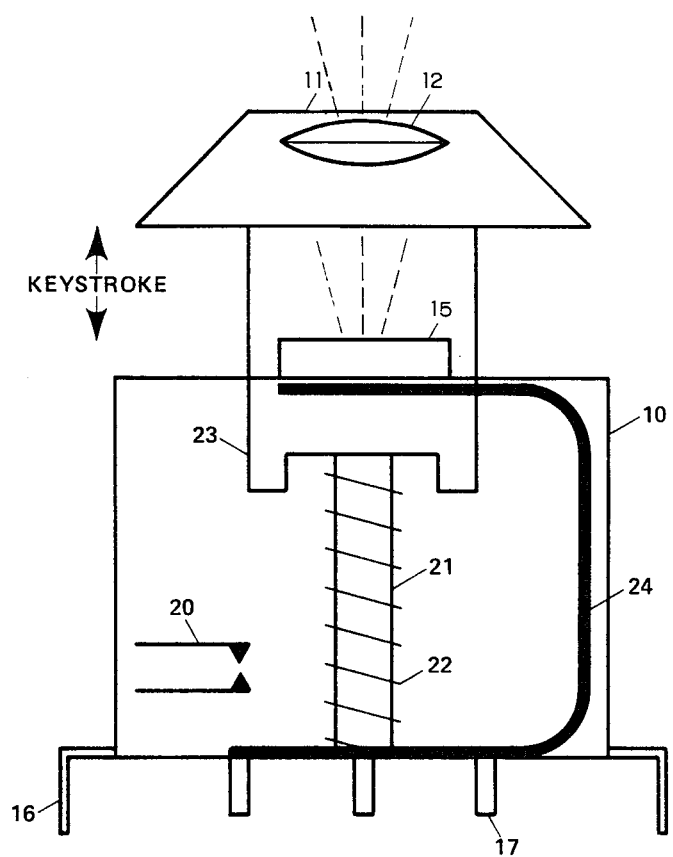
FIG. 2 is a side view of the pictorial representation of FIG. 1.

FIG. 2 is a side view of the pictorial representation of FIG. 1. The key cap is biased in the raised position by spring 22 coiled around the central shaft 21. When the key cap is held in the upper position by spring 22, switch 20 is in the opened position. Upon depressing key cap 11, the lower portion 23 of the key cap 11 contacts switch 20 causing the two parts of the switch to engage thereby closing the switch. A simple mechanical switch has been illustrated, but any type of switch operable by the depression of a key can be used.

The device 15 is connected to the interconnect pins 17 by a flexible cable 24. The use of the flexible cable 24 permits the movement of the key cap 11 and the device 15 in the key cap 11 while connected to the interconnect pins 17. The mounting tabs 16 provide a means to secure the key body to a key board base or keyboard circuit to hold it in place with respect to the other keys on the keyboard.

Figure 3:
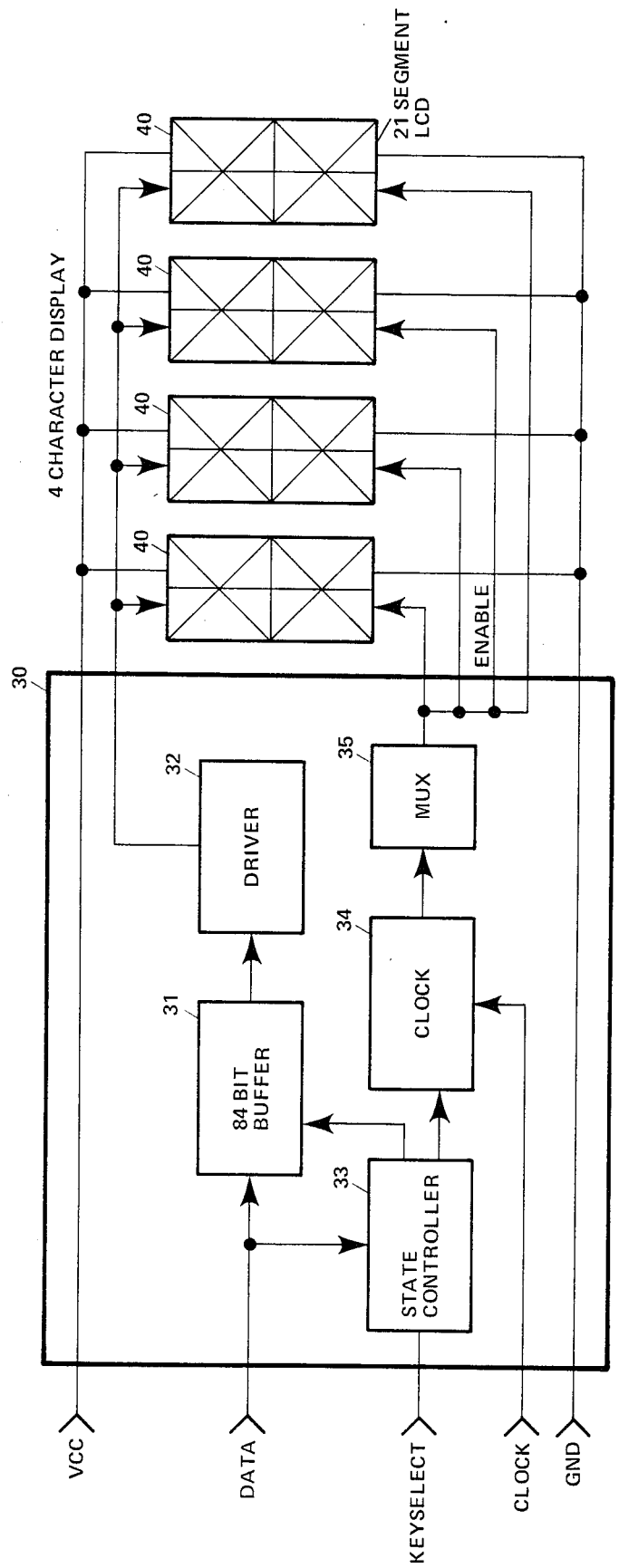
FIG. 3 is a circuit diagram of the microcircuit and display.

FIG. 3 is a circuit diagram of a possible configuration of the microcircuit 30 and the LCD displays 40. Each LCD display 40 may be, for example, a multi-segment display (20 segments plus a decimal point) which can display alphanumeric data as well as limited graphic characters. The displays 40 are interconnected with the microcircuit 30 to received power, enable signals and drive signals, all of which are used to illuminate the segments required to produce the desired character.

Input to the microcircuit 30 is through the interconnect pins 17 and the flexible cable 24. The inputs to the microcircuit 30 are as follows.

KEYSELECT. This is a TTL-level signal that, when pulled low (the lower voltage value of binary signals), instructs the microcircuit 30 to go into a programming mode. When the signal is high, the microcircuit 30 drives the LCDs 40 and displays the programmed character. MOS circuitry also may be used and the signals would be MOS-levels. In either case, the signals would have a high/low value.

CLOCK. The clock signal is a TTL-level signal. When KEYSELECT is low, the clock provides the microcircuit 30 with a timing signal necessary to receive a serial data stream. This input is similar to a serial input port on a computer. When KEYSELECT is high, the CLOCK provides the multiplexed display scan rate.

POWER. This input is the power to drive the microcircuit 30 and the LCD 40. If the LCDs 40 require a voltage different from the usual +5.0 volts of the TTL circuits, then a second power input can be used. Also, the microcircuit 30 may contain an onboard voltage regulator to provide regulated 5.0 volts from a single higher voltage.

RDY. This signal is output by the microcircuit 30 to indicate when it is ready to accept data. When the key is ready, RDY goes high.

RESET. This input signal resets the microcircuit 30 by initializing all internal counters and the state controller.

GROUND. This is the circuit ground connection.

DATA. When the KEYSTROKE line is low, the DATA pin receives a serial stream of TTL-level data at the clock rate. The microcircuit 30 begins reception by looking for a start bit. Upon receiving the start bit, the microcircuit 30 accepts a frame of data. A frame of data may consist of M times N bits, where M is the number of alpha-numeric characters in the LCD 40 and N is the number of bits necessary to encode the character. For example, four characters of ASCII data would require 4×7=28 bits/frame.

Although ASCII data could be sent to the DATA pin, a more versatile method would be to send a bit for each segment in the LCD 40. This would have two advantages. (1) No ASCII LCD decoder or look-up table ROM is needed, and (2) the user may create his own special characters by switching on only those LCD segments which are necessary. This provides a limited graphic capability.

It should be understood to those skilled in the art that the microcircuit 30 described is a simple asynchronous receiver combined with a buffer 31 and a driver 32, and configured as a serial input port.

The buffer 31 is an 84 bit buffer and is interconnected with the segment driver 32 and a state controller 33. The clock 34 drives the state controller 33 and the multiplexer 35. The multiplexer 35 has an output connected to each of the enable inputs to each of the LCDs 40.

The aforementioned state controller 33 is an asynchronus receiver, typical of those employed in current microcomputers. It executes the flow chart shown in FIG. 5.

Figure 5:
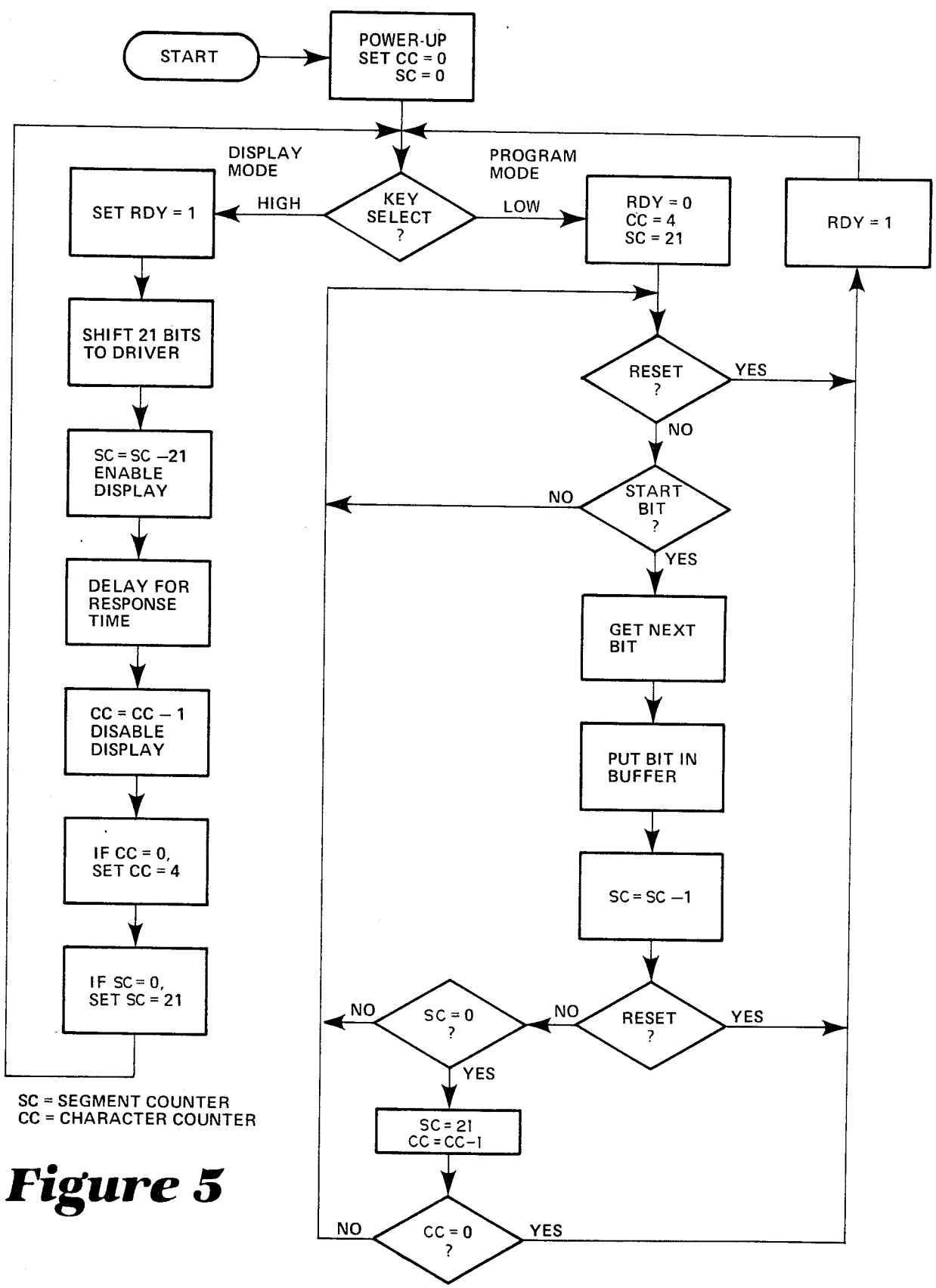
FIG. 5 is a process flow diagram of the operation of the microcircuit of FIG. 3.

The flow chart of FIG. 5 is shown by way of example only. For a display with fewer segments or a different number of characters, the flowchart would vary accordingly.

Figure 4:
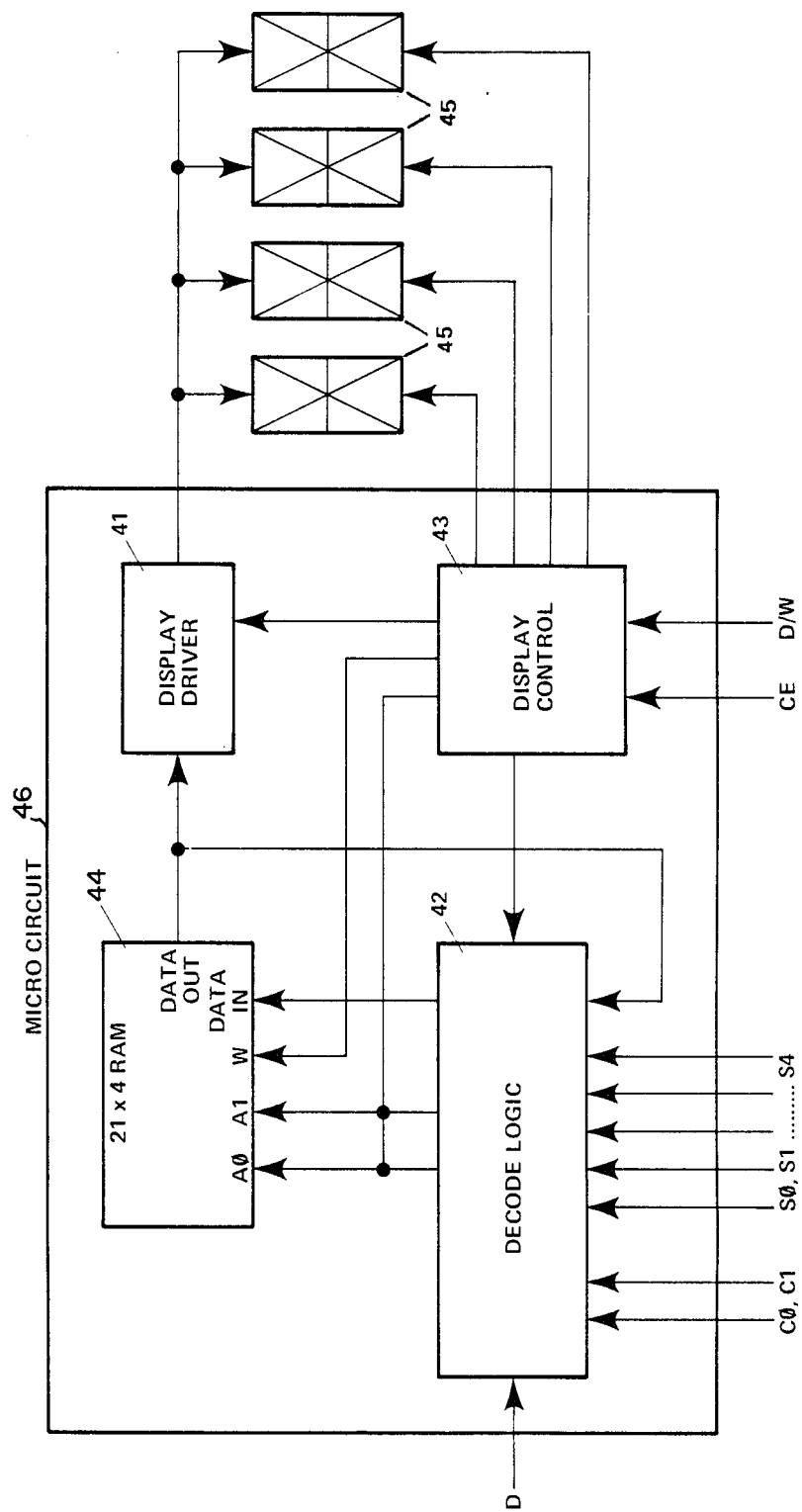
FIG. 4 is a circuit diagram of a second embodiment of the microcircuit.

Another circuit embodiment which provides a programmable key function is illustrated in FIG. 4. This circuit is configured to appear as a write-only memory or a parallel output port on a typical microcomputer.

The microcircuit 46 of FIG. 4 includes a decode circuit 42 for receiving data indicative of the character or characters to be displayed in the displays 45. The decoded data is stored in the random access memory (RAM) 44 and is used to drive the display driver 41. Driver 41 causes the various segments of the displays 45 to be turned on and display the desired character(s). A display Control circuit 43 is interconnected with decode circuit 42, RAM 44, display driver 41 and the displays 45. The display control 43 turns the displays 45 on and off and determines if the displays 45 are to receive data or a change of data to change the displayed characters.

A description of the microcircuit 46 is as follows:

VCC and GROUND. This is the power-in and the ground line of the microcircuit 46.

DISPLAY/WRITE (D/W). When this pin receives a logical low, the display may be written into to change the displayed characters. When the D/W is high, the circuit displays the programmed character.

CHIP ENABLE (CE). When CE is high, the key is enabled and will either display data or accept data, according to the state of D/W. When CE is low, the key is disabled and neither displays nor receives data.

C0,C1 (Character Select). When data is being written to the key, these pins establish which of the four LCD characters is updated.

S0–S4 (Segment Select). When data is being written to the key, these pins establish which segment of a selected character will be updated.

DATA (D). When a segment has been selected for updating, this bit establishes whether the segment is on or off.

Those familiar with interface procedures on microcomputers will realize that this configuration appears as a 128 by 1 bit memory. Although this configuration requires more pins per switch than the previously described key, this "memory" circuit is easier to interface with existing microcomputers having memory-bus designs.

The key may provide more than the usual open/close function. Since the control is an intelligent microcircuit, many output functions may be provided. For example, a debounce TTL-level signal may be its output. Also, if a Hall-Effect switch is used, the circuit could perform signal conditioning necessary to provide a TTL-level signal.

Although a specific embodiment has been described for the programmable key, numerous other embodiments and applications will become apparent to those skilled in the art after reading the foregoing specification and the appended claims.

What is claimed:

1. A programmable key for use on a keyboard having a keyselect switch wherein the key has a display visible in the top thereof, including:
   a key cap and a key body;
   said key cap having a transparent top;
   at least one display device mounted in said key cap and visible through said transparent top;

a microcircuit interconnected with the keyselect switch and said display device for providing programmable control of said display device by means of the keyboard when the keyselect switch is placed in the key programming mode;

said microcircuit including:
- a state controller;
- a buffer;
- a clock;
- a multiplexer and a driver;
- said state controller providing logical control to advance data input into said microcircuit through said buffer and said driver to said display device;
- said clock providing timing signals for said state controller and said multiplexer; and
- said multiplexer providing enable signals to turn said display device on to display the characters indicative of the data input to said microcircuit; and said key cap mounted in a moveable relationship with said key body so that upon depression of said key cap a switching function is accomplished.

2. The programmable key according to claim 1 wherein said display device displays one or more characters indicative of the function of the key, and the one or more characters displayed are changed each time the function of the key is changed.

3. A programmable key for use on a keyboard having a keyselect switch wherein the key has a display visible in the top thereof and has circuitry for transmitting data to the key, including:
- a key cap having at least one character display means visibly located in the top of said key cap for displaying a character;
- a microcircuit located under said display means and electrically connected thereto;
- said microcircuit having means for receiving data transmitted from the keyboard to the key when the keyselect switch is placed in the key programming mode, and for changing the character displayed by said display means based upon the received data;
- said microcircuit further including a state controller and a buffer for receiving data transmitted to the key and for generating the characters displayed by said display means; and
- a key base having said key cap moveably mounted thereon so that upon depression of said key cap the function of the key and the function displayed by said display means is accomplished.

4. The programmable key according to claim 3 wherein said microcircuit further includes means for controlling characters displayed by a plurality of display means.

5. A programmable key for use on a keyboard having a keyselect switch wherein the key has a display visible in the top thereof, including:
- a key cap and a key body;
- said key cap having a transparent top;
- at least one display device having a plurality of display segments mounted in said key cap and visible through said transparent top;
- a microcircuit interconnected with the keyselect switch and said display device for providing programmable control of said display device by means of the keyboard when the keyselect switch is placed in the key programming mode;

said microcircuit including:
- decode logic means for receiving data indicative of the key character to be displayed;
- random access memory means for storing the decoded data indicative of the character to be displayed;
- display driver means for enabling said display segments to be used for displaying the selected character; and
- display control means for enabling or disabling each display device and to control when each display device receives a change of data to change the displayed character; and said key cap mounted in a moveable relationship with said key body so that upon depression of said key cap a switching function is accomplished.

* * * * *